United States Patent [19]

Franz et al.

[11] 4,301,197

[45] Nov. 17, 1981

[54] SILOXANE RELEASE SURFACES ON GLASS

[75] Inventors: Helmut Franz; James H. Hanlon, both of Pittsburgh; Lloyd G. Shick, Natrona Heights, all of Pa.

[73] Assignee: PPG Industries, Inc., Pittsburgh, Pa.

[21] Appl. No.: 99,775

[22] Filed: Dec. 3, 1979

[51] Int. Cl.$^3$ .................... B05D 3/00; B05D 3/12; B32B 9/04; C08G 77/12
[52] U.S. Cl. ............................. 427/353; 156/99; 156/329; 427/354; 427/355; 428/429; 428/447; 528/31
[58] Field of Search ............... 528/31; 156/99, 247, 156/329; 428/447, 451, 412, 425.5, 429; 427/353, 354, 355

[56] References Cited

U.S. PATENT DOCUMENTS

| | | | |
|---|---|---|---|
| 2,184,876 | 12/1939 | Sherts | 428/437 X |
| 2,811,408 | 10/1957 | Braley | 264/338 X |
| 3,616,839 | 11/1971 | Burrin | 156/99 X |
| 3,666,614 | 5/1972 | Snedeker | 428/429 X |
| 3,808,077 | 4/1974 | Rieser et al. | 156/99 X |
| 3,900,617 | 8/1975 | Grenoble | 427/387 |
| 4,027,072 | 5/1977 | Molari | 428/412 |
| 4,204,025 | 5/1980 | Lebrand et al. | 156/99 X |

*Primary Examiner*—Michael R. Lusignan
*Attorney, Agent, or Firm*—Donna L. Seidel

[57] ABSTRACT

Highly efficient release surfaces on glass substrates prepared by treatment of the glass with poly alkyl hydrogen siloxane are disclosed.

7 Claims, No Drawings

SILOXANE RELEASE SURFACES ON GLASS

FIELD OF THE INVENTION

The present invention relates generally to the art of treating glass surfaces and more particularly to the art of treating glass surfaces to improve the release of polymeric materials.

THE PRIOR ART

Laminates of glass and plastic or multiple layers of plastic are known in the art of safety and security glazing. When a plastic surface is to be exposed in the final product, it is important to have a high quality release surface on the pressing plate used in the lamination process.

U.S. Pat. No. 2,184,876 to Sherts discloses laminating glass to plasticized polyvinyl acetal using an outer layer of unplasticized resin covered by a flexible sheet plated with chromium as a parting material to facilitate release of the plastic surface.

U.S. Pat. No. 2,811,408 to Braley teaches generally the use of a copolymeric siloxane resin as a release agent on metal, wood, ceramic or plastic mold surfaces.

U.S. Pat. No. 3,808,077 to Rieser et al discloses fabricating bilayer safety glass by assembling a preformed plastic sheet between a glass sheet and a mold coated with a release agent. Suggested release agents include polyvinyl fluoride, polyethylene glycol terephthalate, organopolysiloxanes and high silica content glass resins.

SUMMARY OF THE INVENTION

Highly efficient release surfaces on glass substrates are prepared according to the present invention by treatment of the glass with poly alkyl hydrogen siloxane. The treated glass surface effectively releases such materials as polycarbonates, acrylics and polyurethanes when employed in press polishing or press laminating processes. Treatment of a glass substrate with poly alkyl hydrogen siloxane to provide a release surface according to the present invention may be accomplished by simply applying the poly alkyl hydrogen siloxane to the glass surface, rinsing off any excess and allowing the release surface to dry before use.

DESCRIPTION OF THE PREFERRED EMBODIMENTS

Release surfaces are needed in a variety of applications in the fabrication of automotive and aircraft transparencies. For example, release surfaces are employed in press polishing and press laminating of acrylics and polycarbonates, fusion bonding of polycarbonates, lamination of polyvinyl butyral or polyurethane innerlayers to glass for bilayer windshields, casting or reaction forming of polymeric materials, and press stretching of acrylics and other plastics.

The critical requirements for a practical useful release coating are ease of application, low health hazard, no transfer of release agent to the plastic, no effect on the strength or optical quality of the released product, durability and ease of reconditioning of the release surface and above all good release properties.

According to the present invention, a superior release surface is obtainable by treating a glass surface with a poly alkyl hydrogen siloxane. By simply wiping on a solution of the poly alkyl hydrogen siloxane and rinsing or wiping off the excess after evaporation of the solvent, an efficient durable release surface is formed which is useful in a variety of applications. The poly alkyl hydrogen siloxane is believed to adhere to the treated glass surface by reaction of the silicon-bonded hydrogen with silanol groups at the glass surface thereby forming an essentially monomolecular layer of the poly alkyl hydrogen siloxane.

The poly alkyl hydrogen siloxane release surface of the present invention has several advantages over other release surfaces known in the art. First, it can be applied by simple wiping as opposed to more elaborate techniques required for certain other release agents. Second, the poly alkyl hydrogen siloxane release surface is prepared at ambient temperatures in contrast to high temperature cures required by some release agents. Third, the poly alkyl hydrogen siloxane release surface of the present invention is very versatile, releasing acrylics, polycarbonates, polyvinyl butyral and polyurethanes. Finally, the poly alkyl hydrogen siloxane release surface of the present invention is quite durable, typically providing more than 50 excellent release operations. Even when the release properties eventually begin to diminish, reconditioning of the release surface is easily accomplished by simply applying additional poly alkyl hydrogen siloxane. No elaborate cleaning or reconditioning techniques are necessary.

The poly alkyl hydrogen siloxane materials useful for providing release surfaces according to the present invention have the general formula

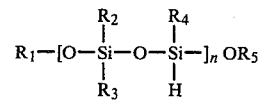

wherein n may be up to about 1000 and $R_{1-5}$ may be any of the lower alkyl radicals, preferably containing from 1 to 7 carbon atoms or aryl radicals containing about 6 carbon atoms. Preferred alkyl radicals for $R_{2-4}$ are branched lower alkyl radicals such as isopropyl or tertiary butyl. The preferred value for n in a range of about 5 to 900 is such that the molecular weight of the poly alkyl hydrogen siloxane is in the range of about 1000 to 3000.

The solutions of poly alkyl hydrogen siloxane employed in the preparation of release surfaces according to the present invention preferably contain about 5 to 25 percent by weight siloxane in an appropriate solvent. Any solvent for the siloxane may be used, but the preferred solvents are those which are economical, easy to use, low health hazards, water miscible and effective in providing a durable efficient release surface. Alcohols are particularly good solvents for use according to the present invention, and isopropanol is preferred. Preferably an alcohol solvent is acidified with a mineral acid before the poly alkyl hydrogen siloxane is dissolved therein. In a particularly preferred embodiment, sulfuric acid is added to isopropanol and poly isopropyl hydrogen siloxane dissolved therein.

The solution of poly alkyl hydrogen siloxane is then applied to the glass surface, preferably by a simple wiping technique. The excess solution is preferably rinsed off before drying. However, the excess may be buffed off after drying. The release surface is then ready for use; no high temperature curing is necessary.

The poly alkyl hydrogen siloxane release surface of the present invention is useful for release of acrylics, polycarbonates, polyvinyl butyral, polyurethanes and other plastic materials in a variety of operations such as press polishing, laminating, fusion bonding, casting, reaction forming and press stretching. The release surfaces exhibit excellent release properties with essentially no transfer to or deleterious effects on the strength or optical quality of the plastic and sufficient durability to provide multiple release operations with no reconditioning which, when needed, requires only wiping on additional poly alkyl hydrogen siloxane. The present invention will be further understood from the description of a specific example which follows.

EXAMPLE I

A glass surface is treated with an isopropanol, acidified with sulfuric acid, solution of about 5 percent poly alkyl hydrogen siloxane, available from Unelko Corporation under the tradename Rain-X. The alkyl moiety of the particular siloxane comprises methyl groups and branched alkyl groups such as isopropyl or tertiary butyl. The application is effected by a simple wiping with light hand buffing and removal of excess material by wiping with a damp cloth. Upon drying, the release surface is ready for use.

The release surface is employed in an aircraft transparency fabrication technique against a polycarbonate surface and provides good release with no detrimental effect on the optical properties of the transparency. The release surface is used 50 times without reconditioning, indicating excellent durability.

We claim:

1. In a method of fabricating plastic material wherein the plastic contacts a surface of a rigid glass substrate from which the plastic must be released, the improvement which comprises treating the glass surface with a composition consisting essentially of a poly alkyl hydrogen siloxane to form a durable surface which releases said plastic.

2. The method according to claim 1, wherein the poly alkyl hydrogen siloxane is in solution in acidified alcohol.

3. The method according to claim 2, wherein the poly alkyl hydrogen siloxane is in solution in isopropanol which contains sulfuric acid.

4. The method according to claim 2, wherein the glass surface is treated with the poly alkyl hydrogen siloxane by wiping the glass surface with the solution and rinsing off the excess with water.

5. The method according to claim 4, wherein the poly alkyl hydrogen siloxane contains alkyl radicals selected from the group consisting of methyl, isopropyl and tertiary butyl.

6. The method according to claim 1, wherein the fabricating comprises a technique selected from the group consisting of press polishing, laminating, casting, reaction forming and stretching.

7. The method according to claim 1, wherein the plastic material is selected from the group consisting of acrylics, polycarbonates, polyvinyl acetals and polyurethanes.

* * * * *